United States Patent [19]

Kania

[11] Patent Number: 4,614,777

[45] Date of Patent: Sep. 30, 1986

[54] ADDITION INTERPOLYMERS FROM ISOBORNYL (METH)ACRYLATE WHICH CONTAIN ALKOXYSILANE AND/OR ACYLOXYSILANE GROUPS

[75] Inventor: Charles M. Kania, Tarentum, Pa.

[73] Assignee: PPG Industries, Inc., Pittsburgh, Pa.

[21] Appl. No.: 762,490

[22] Filed: Aug. 5, 1985

[51] Int. Cl.$^4$ .............................................. C08F 30/08
[52] U.S. Cl. .................................... 526/279; 526/282
[58] Field of Search ................................ 526/279, 282

[56] References Cited

U.S. PATENT DOCUMENTS

| | | | |
|---|---|---|---|
| 2,992,203 | 7/1961 | Protzman | 260/45.5 |
| 3,681,298 | 8/1972 | Hurwitz et al. | 260/78.5 R |
| 3,940,353 | 2/1976 | Martorano | 260/22 CB |
| 4,124,551 | 11/1978 | Mathai et al. | 260/23 AR |
| 4,131,572 | 12/1978 | Brendley, Jr. | 260/17 R |
| 4,254,248 | 3/1981 | Friends | 526/282 |
| 4,276,402 | 6/1981 | Chromecek | 526/279 |
| 4,286,021 | 8/1981 | Brendley, Jr. | 428/413 |

*Primary Examiner*—Paul R. Michl
*Attorney, Agent, or Firm*—Thomas M. Breininger

[57] ABSTRACT

Disclosed is an addition interpolymer (vinyl type) containing at least one silicon atom directly bonded to a hydrolyzable group in which the addition interpolymer is derived from a mixture of copolymerizable ethylenically unsaturated monomers containing an isobornyl group-containing monomer selected from the group consisting of isobornyl methacrylate, isobornyl acrylate and a mixture thereof. The amount of the isobornyl group-containing monomer ranges from 10 to 60 percent by weight based on the total weight of the mixture of copolymerizable ethylenically unsaturated monomers.

26 Claims, No Drawings

ADDITION INTERPOLYMERS FROM ISOBORNYL (METH)ACRYLATE WHICH CONTAIN ALKOXYSILANE AND/OR ACYLOXYSILANE GROUPS

BACKGROUND OF THE INVENTION

This invention relates to addition interpolymers especially useful in coating compositions. More particularly, this invention relates to addition interpolymers prepared from isobornyl (meth)acrylate which contain silane groups which interpolymers can be included in coating compositions as the main film former. The resultant coating compositions are curable at low temperatures and are especially useful in the automotive refinish area. The coating compositions are also useful for automotive original equipment finishes where reduced curing temperatures are desired, for example from 150 to 180 degrees F. (65 to 85 degrees C.).

The coatings industry has been extensively involved in energy conservation activity for a number of years. Most coating compositions require an elevated temperature of at least about 120 degrees Celsius (degrees C.) for curing purposes. This represents a considerable expenditure of energy. Additionally, coating compositions which are intended for use in the automotive refinish area oftentimes are applied under conditions such that the aforementioned elevated temperatures are not available for curing purposes. Ideally, the coating composition which can be cured at relatively low temperatures, for example, below about 82 degrees C., and preferably at ambient temperature, would be most useful. Previous attempts to develop such coating compositions have resulted in compositions which were extremely slow to cure and/or produce films which were deficient in one physical property or another.

In addition to there being a need for a coating composition which is capable of curing at a low temperature, it is also desirable that such compositions be non-isocyanate based.

In accordance with this invention, an ambient temperature moisture-curable coating composition has been developed which has an acceptable rate of cure and which, upon curing, produces a film having excellent appearance and durability properties, particularly increased hardness and increased gloss, and surprisingly excellent distinctness of image (DOI). A film having a high degree of distinctness of image when viewed from a direction close to the normal to the surface and under, for example, a light fixture such as a fluorescent light fixture having a cross-hatch grid in front of the bulb, exhibits a reflected image of the lighted fixture in the film which appears clear and sharply distinct and which appears to originate deep in the film.

SUMMARY OF THE PRESENT INVENTION

The present invention is directed to an addition interpolymer (vinyl type) containing at least one silicon atom directly bonded to a hydrolyzable group in which the addition interpolymer is derived from a mixture of copolymerizable ethylenically unsaturated monomers containing an isobornyl group-containing monomer selected from the group consisting of isobornyl methacrylate, isobornyl acrylate and a mixture thereof. The amount of the isobornyl group-containing monomer ranges from 10 to 60 percent by weight based on the total weight of the mixture of copolymerizable ethylenically unsaturated monomers.

A preferred embodiment of the present invention is directed to an addition interpolymer containing alkoxy silane moieties and/or acyloxy silane moieties prepared by reaction of a mixture of monomers containing (i) one or more, typically at least two, ethylenically unsaturated monomers which do not contain silicon atoms, hereinafter referred to for convenience as ethylenically unsaturated silicon-free monomers, comprising isobornyl (meth)acrylate, and (ii) a copolymerizable ethylenically unsaturated alkoxy silane monomer and/or a copolymerizable ethylenically unsaturated acyloxy silane monomer.

An addition interpolymer of the invention preferably has a peak molecular weight, as determined by gel permeation chromatography, of from about 2,000 to about 20,000 and a calculated glass transition temperature (Tg) of at least about 25 degrees C. As used herein "isobornyl (meth)acrylate" for convenience is intended to refer to isobornyl methacrylate and/or isobornyl acrylate.

The present invention is also directed to a coating composition comprising an addition interpolymer of the invention either as the sole film-forming resin or in combination with another film-forming thermoplastic and/or thermosetting resin. A coating composition of the invention may be cured with heat or at ambient temperature in the presence of moisture. An advantage of preferred compositions of the invention is that they can be moisture-cured at ambient (room) temperature. A distinct advantage of compositions of the invention is that they can be cured to films not only having improved hardness, but also unexpectedly excellent gloss and distinctness of image (DOI) when compared to addition interpolymers prepared without utilizing isobornyl (meth)acrylate.

Addition interpolymers of the present invention have been found to provide a number of advantages when utilized in a topcoating composition which hardens or cures to form a clear topcoat in a coating system becoming increasingly popular, particularly in the automotive industry, known as "color plus clear". A copending application to C. Kania filed even date herewith titled "Color Plus Clear Coating Method Utilizing Addition Interpolymers From Isobornyl (Meth)acrylate And Containing Alkoxy Silane And/Or Acyloxy Silane Groups", is directed to a coating method in which a basecoating composition is applied to a substrate to form a basecoat followed by the application of a topcoating composition to the basecoat wherein an addition interpolymer is incorporated in either or both of the basecoating and topcoating compositions.

DETAILED DESCRIPTION OF THE INVENTION

The ethylenically unsaturated silicon-free monomers employed in making the interpolymer contain at least one ethylenic carbon to carbon double bond. The ethylenically unsaturated silicon-free monomers contain isobornyl (meth)acrylate as a comonomer. Moreover, isobornyl (meth)acrylate may be used as the only ethylenically unsaturated silicon-free monomer.

An addition interpolymer of the invention may be prepared by various methods. For example, the addition interpolymer may be prepared by hydrosilylation of an isobornyl group-containing addition interpolymer containing carbon-carbon double bonds with a hydrosilane examples of which hydrosilanes include halogenated silanes such as methyldichlorosilane, trichlorosilane, and phenyl dichlorosilane; alkoxysilanes such as methyldiethoxysilane, methyldimethoxysilane, phenyldimethoxysilane, trimethoxysilane, and triethoxysilane; acyloxy silanes such as methyldiacetoxysilane, phenyldiacetoxysilane, and triacetoxysilane; ketoxymate silanes such as bis(dimethylcyclohexylketoxymate)methylsilane, and bis(cyclohexylketoxymate)methylsilane; alkenyloxysilanes such as methyldiisopropenoxysilane, and triisopropenoxysilane; and other silanes such as methyldiaminoxysilane, triaminoxysilane, methyldiaminosilane and triaminosilane. The carbon-carbon double bonds can be incorporated into the addition interpolymer by employing compounds such as allyl compounds examples of which include allyl acrylate and allyl methacrylate. The reaction of the hydrosilane with the isobornyl group-containing addition interpolymer containing carbon-carbon double bonds employs a catalyst of a transition metal complex, examples of which transition metals include platinum, rhodium, cobalt, palladium and nickel. Reference can be made to U.S. Pat. Nos. 4,191,713 and 4,399,261 regarding process conditions for carrying out hydrosilylation reactions.

As indicated above, a preferred addition interpolymer of the invention is formed from at least two components, i.e., one or more ethylenically unsaturated silicon-free monomers and an ethylenically unsaturated compound selected from an alkoxysilane monomer, an acyloxysilane monomer or a mixture thereof. The term "ethylenically unsaturated" is employed in a broad sense and is intended to encompass, for example, vinyl compounds, acrylic compounds and methacrylic compounds. The basic criteria with respect to the ethylenically unsaturated monomer are that it contains at least one ethylenic carbon to carbon double bond, that it is copolymerizable without gelation with the the silane monomer component, and that it does not otherwise preclude the utilization of the finished interpolymer.

In addition to isobornyl (meth)acrylate, another ethylenically unsaturated silicon-free monomer can be, and typically is employed in forming the addition interpolymer of the invention. Examples of suitable ethylenically unsaturated silicon-free monomers for preparing the addition interpolymer herein include the alkyl acrylates, such as methyl acrylate, ethyl acrylate, butyl acrylate, propyl acrylate, and 2-ethylhexyl acrylate; the alkyl methacrylates, such as methyl methacrylate, butyl methacrylate, 2-ethylhexyl methacrylate, decyl methacrylate, and lauryl methacrylate; and unsaturated nitriles, such as acrylonitrile, methacrylonitrile and ethacrylonitrile. Still other ethylenically unsaturated monomers which can be used include: vinyl aromatic hydrocarbons such as styrene, alpha methyl styrene, and vinyl toluene; vinyl acetate; vinyl chloride; and epoxy functional monomers such as glycidyl methacrylate.

In practice, in order to produce desirable properties in the interpolymer, it is preferred to use combinations of ethylenically unsaturated silicon-free monomers which form hard polymer segments, such as styrene, vinyl toluene and alkyl methacrylates having from 1 to 4 carbon atoms in the alkyl group with monomers which form soft polymer segments, such as the alkyl esters of acrylic or methacrylic acid, the alkyl groups having from 1 to 13 carbon atoms in the case of acrylic esters and from 5 to 16 carbon atoms in the case of methacrylic esters. Illustrative of monomers which form soft polymer segments are ethyl acrylate, butyl acrylate, 2-ethylhexyl acrylate, 2-ethylhexyl methacrylate, decyl methacrylate, and lauryl methacrylate. In addition to the hardening and softening monomers, as previously indicated, other monomers such as vinyl acetate, vinyl chloride, vinyl toluene, and acrylonitrile may be included to achieve specific properties in the interpolymer. The interpolymer is formed from about 50 percent to about 95 percent, preferably from about 70 percent to about 90 percent by weight of the ethylenically unsaturated silicon-free monomers based on the total weight of all monomers utilized for preparing the interpolymer. The amount of isobornyl (meth)acrylate for preparing the addition interpolymer of the invention can range from 10 percent to 60 percent by weight based on the total weight of all monomers utilized for preparing the interpolymer and thus includes, for example, the total weight of (i) the ethylenically unsaturated monomers which do not contain silicon atoms, i.e., the ethylenically unsaturated silicon-free monomers, and (ii) the copolymerizable ethylenically unsaturated alkoxy silane monomer and/or the copolymerizable ethylenically unsaturated acyloxy silane monomer. Advantages obtainable in cured films from addition interpolymers prepared from less than 10 percent by weight of isobornyl (meth)acrylate, based on the aforesaid total weight of all monomers utilized for preparing the interpolymer, fall off markedly when less than the aforesaid 10 percent by weight of isobornyl (meth)acrylate is utilized. Preferred interpolymers of the invention are prepared utilizing from 40 percent to 20 percent by weight of isobornyl (meth)acrylate based on the total weight of all monomers utilized for preparing the interpolymer.

The other component of the addition interpolymer is an organosilane compound, which in a preferred embodiment of the invention is an ethylenically unsaturated alkoxysilane, an ethylenically unsaturated acyloxysilane or a mixture thereof. Alkoxysilanes which can suitably be employed and are preferred are the acrylatoalkoxysilanes, such as gamma-acryloxypropyltrimethoxysilane and gamma-acryloxypropyldimethoxymethylsilane as well as the methacrylatoalkoxysilanes, such as gamma-methacryloxypropyltrimethoxysilane, gamma-methacryloxypropyltriethoxysilane, gamma-methacryloxypropyldimethoxymethylsilane, and gamma-methacryloxypropyltris-(2-methoxyethoxy)silane.

Among the above listed alkoxysilanes, gamma-methacryloxypropyltrimethoxysilane is especially preferred because of its greater reactivity. Examples of other alkoxysilanes which may be employed include the vinylalkoxysilanes such as vinyltrimethoxysilane, vinyltriethoxysilane and vinyltris(2-methoxyethoxy)silane. Examples of ethylenically unsaturated acyloxysilanes which may be employed include acrylato-, methacrylato- and vinylacetoxysilanes, such as vinylmethyldiacetoxysilane, acrylatopropyltriacetoxysilane, and methacrylatopropyltriacetoxysilane. The interpolymer is formed from about 10 percent to about 30 percent by weight of the above described ethylenically unsaturated silane monomer based on the total weight of all monomers utilized for preparing the interpolymer.

The preferred addition interpolymer is formed by interpolymerizing the ethylenically unsaturated silicon-free monomers with the ethylenically unsaturated silane monomers in the presence of a vinyl polymerization initiator. The preferred initiators are azo compounds such as, for example, alpha alpha'-azobis(isobutyronitrile); peroxides such as benzoyl peroxide and cumene hydroperoxide; and tertiary butyl peracetate, diisopropyl percarbonate, butyl isopropyl peroxy carbonate and similar compounds. The quantity of initiator employed can be varied considerably; however, in most instances, it is desirable to utilize from about 0.1 to about 10 percent based on the weight of monomer solids. A chain modifying agent or chain transfer agent is ordinarily added to the polymerization mixture. The mercaptans, such as dodecyl mercaptan, tertiary dodecyl mercaptan, octyl mercaptan, hexyl mercaptan and mercaptoalkyl trialkoxysilanes, e.g., 3-mercaptopropyltrimethoxysilane, may be used for this purpose as well as other chain transfer agents such as cyclopentadiene, allyl acetate, allyl carbamate, and mercaptoethanol. The mercaptoalkyl trialkoxysilanes have been found to be especially useful where increased durability is needed. Thus, a mercaptoalkyl trialkoxysilane at a level of 0.5 to 15 parts by weight per 100 parts by weight of monomers previously has been found to increase the durability of a coating based on an addition interpolymer.

Addition interpolymers of the invention may be prepared having a wide range of molecular weights. However, typically an interpolymer of the invention has a peak molecular weight, as determined by gel permeation chromatography, of from about 2,000 to about 20,000, preferably from about 2,000 to about 15,000, and most preferably from about 2,000 to about 10,000 when the addition interpolymer is utilized in a coating composition.

The polymerization reaction is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

Choice of the specific ethylenically unsaturated silicon-free monomers and ethylenically unsaturated silane monomers typically is made such that the addition interpolymer has a calculated glass transition temperature (Tg) of at least about 25 degrees C., preferably from about 30 degrees C. to about 120 degrees C. The Tg is calculated using a generally known equation as found, for example, in "Fundamentals Of Acrylics" by W. H. Brendley, Jr., Paint And Varnish Production, Vol. 63 No. 7, July, 1973, pages 19–27. If the glass transition temperature of the addition interpolymer is too low, for example less than about 25 degrees C., the physical properties of the cured films for protective coatings applications are adversely affected. Such physical properties include, for example, the gloss retention of the films which is a measure of long term durability, the mar resistance of the films, the abrasion resistance of the films, and the desired hardness of the films for protective coatings applications. It has been found that films prepared from the addition interpolymers of the present invention employing an appropriate level of isobornyl (meth)acrylate as set forth infra, not only exhibit an excellent degree of hardness, but also provide unexpectedly superior appearance properties such as excellent gloss and exceptional distinctness of image (DOI). Moreover, it has been found that not only can cured films having an excellent combination of physical and appearance properties be prepared from the addition interpolymers of the invention when cured at ambient temperature (room temperature) for about 24 hours, but that cured films having comparable physical and appearance properties (immediately after baking) can be prepared from the addition interpolymers of the invention when baked for about 1 hour or less, typically for about ½ hour or less, at from 150 to 280 degrees F. (65 to 138 degrees C.). One of the problems with cured films prepared from known silane addition interpolymers, even when prepared utilizing a monomer such as methyl methacrylate, has been low hardness immediately following either cure at ambient temperature for 24 hours or immediately following baking at elevated temperature for about ½ hour which hardness is undesirably low for various high performance coatings applications such as for automotive refinish or automotive original equipment applications.

The addition interpolymers of the invention have utility as film formers in coating systems. Typically, such a coating system contains the interpolymer, an effective amount of a cure-promoting catalyst and, for application purposes, often a solvent. The cure-promoting catalyst may be: an organic acid, such as, for example, p-toluenesulfonic acid, and n-butylphosphoric acid; a metallic salt of an organic acid, such as, for example, tin naphthenate, tin benzoate, tin octoate, tin butyrate, dibutyltin dilaurate, dibutyltin diacetate, iron stearate, and lead octoate; an organic base, such as, for example, isophorone diamine, methylene dianiline, and imidazole; a compound containing a fluoride ion such as tetrabutyl ammonium fluoride, benzyl trimethyl ammonium fluoride, sodium fluoride, potassium fluoride and cesium fluoride; or a mixture thereof.

The specific amounts of cure-promoting catalyst which are included in the compositions of the invention vary considerably depending upon factors such as the rate of cure desired, the specific composition of the interpolymer component, the amount of moisture present in the ambient atmosphere and the like. However, in general, the coating compositions of the invention may contain from about 0.01 parts to about 5 parts by weight of cure-promoting catalyst based on 100 parts by weight of interpolymer solids.

In addition to the foregoing components, the compositions of this invention may contain optional ingredients, including various pigments of the type ordinarily utilized in coatings of this general class. In addition, various fillers; plasticizers; antioxidants; mildewcides and fungicides; surfactants; various flow control agents including, for example, thixotropes and additives for sag resistance and/or pigment orientation based on polymer microparticles (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference; and other such formulating additives may be employed in some instances. A composition of the invention is ordinarily contained in an organic solvent which may be any solvent or solvent mixture in which the materials employed are compatible and soluble to the desired extent. It has been found previously that a primary thiol, e.g., dodecylmercaptan, isooctylthioglycolate, and the mercaptoalkyl trialkoxysilanes such as gamma-mercaptopropyltrimethoxysilane, when included in a coating composition based on a silane addition interpolymer, enhances the gloss of the cured coating and such components for enhancing gloss optionally may be included in a composition of the present invention. When a primary thiol is utilized in a composition of the invention a level of about 0.1 parts by weight to about 5 parts by weight primary thiol per 100 parts by weight interpolymer provides this enhanced gloss effect. However, it has been found that compositions of the present invention based on the addition interpolymers of the invention prepared utilizing an appropriate level of isobornyl (meth)acrylate can be cured to provide films having in addition to excellent durability properties, unexpectedly excellent appearance properties such as high gloss and exceptional distinctness of image when compared to silane addition interpolymers prepared without employing an effective level of isobornyl (meth)acrylate. Moreover, the benefits with respect to appearance of cured films from compositions of the invention, can be obtained without the utilization of such gloss enhancing additives as the aforesaid primary thiols.

Compositions of the invention can be applied to a substrate by any conventional method such as brushing, dipping, flow coating, roll coating, and spraying. Typically they are most often applied by spraying. One advantage of the interpolymers of the invention is in their ability to be spray applied at a high solids concentration, i.e., 40 percent total solids, preferably 50 percent total solids and greater when the viscosity of the composition containing the interpolymer is 25 seconds or less on a No. 4 Ford Cup. Conventional spray techniques and equipment can be utilized. The compositions may be applied over a wide variety of substrates such as wood, metals, glass, cloth, plastics, foams and the like, as well as over primers.

As indicated, the coating compositions of this invention can be cured by heating or typically by exposure to atmospheric moisture at ambient temperature. Thus, once the interpolymer component and cure-promoting catalyst component are brought in contact with each other, as by admixing, and exposed to the ambient atmosphere, the composition will begin to cure. Accordingly, it is desirable in some instances to prepare the compositions of this invention in the form of a two package system, i.e., one package containing the interpolymer component along with any desired optional ingredients and a second package containing the cure-promoting catalyst component. The interpolymer component of the composition in the absence of the cure-promoting catalyst exhibits good pot life, i.e., 6 months or more when stored at temperatures of 120 degrees Fahrenheit (F), i.e., 48.9 degrees C., or less. When it is desired to coat a substrate with the composition, the components of the two packages are merely mixed together just prior to application and the resulting composition applied to the substrate by one of the methods such as those described above.

The compositions of this invention have utility in general coating applications and can also be useful in specialty applications such as automotive paints including paints for automobile refinishing. The addition interpolymers of the present invention have been found to be especially useful in a so-called "color plus clear" method of coating which method is a subject of a co-pending application to C. Kania referred to previously herein.

As indicated previously, a coating composition of the invention can comprise an addition interpolymer of the invention either as the sole film-forming resin or optionally in combination with an additional film-forming thermoplastic and/or thermosetting resin. Examples of such additional film-forming thermoplastic and/or thermosetting resins include the generally known cellulosics, acrylics, aminoplasts, urethanes, polyesters, polyethers, epoxies or mixtures thereof.

Pigments suitable for a composition of the invention include a wide variety of pigments generally known for use in coating compositions. Suitable pigments include both metallic flake pigments and various white and colored pigments.

Examples of metallic-flake pigments include generally known metallic flakes such as aluminum flakes, nickel flakes, tin flakes, silver flakes, chromium flakes, stainless steel flakes, gold flakes, copper flakes and combinations thereof. Examples of white and colored pigments include generally known pigments based on metal oxides; metal hydroxides; metal sulfides; metal sulfates; metal carbonates; carbon black; china clay; phthalo blues and green, organo reds, and other organic dyes.

Coating compositions of the invention based on the addition interpolymers of the invention provide cured films having an excellent combination of properties such as the hardness required for automotive coatings both for original equipment automotive applications and automotive refinishing applications, good solvent resistance, high initial gloss, excellent gloss retention, as well as exceptionally good distinctness of image. Appearance properties such as, for example, high gloss and distinctness of image are particularly critical for films required in high performance coatings applications as exist, for example, in both the automotive original equipment and automotive refinish industries.

The Examples which follow are submitted for the purpose of further illustrating the nature of the present invention and should not be regarded as a limitation on the scope thereof.

As used in the body of the specification, examples, and claims, all percents, ratios and parts are by weight unless otherwise specifically indicated. As used herein, "pbw" stands for "parts by weight".

Glass transition temperatures, where given for the acrylic silane addition interpolymers in the following examples, are calculated using a generally known equation as found, for example, in "Fundamentals of Acrylics" by W. H. Brendley, Jr., *Paint and Varnish Production*, Vol. 63 No. 7, July 1973, pages 19–27. In these calculations values of 110 degrees C. and 125 degrees C. are used for the glass transition temperatures of homopolymers of gamma-methacryloxypropyl trimethoxy silane and isobornyl methacrylate respectively.

EXAMPLE 1

The following monomers are used to make an addition interpolymer of the invention:

| | Percent by Weight |
|---|---|
| Isobornyl methacrylate | 40.0 |
| Butyl methacrylate | 20.0 |
| Butyl acrylate | 20.0 |
| Gamma-methacryloxy-propyltrimethoxysilane | 20.0 |

A reaction vessel equipped with condenser, stirrer, thermometer and means for maintaining a nitrogen blanket is charged with 428 grams (g) of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 928 g isobornyl methacrylate, 464 g butyl methacrylate, 464 g butyl acrylate, and 464 g gamma-methacryloxypropyltrimethoxysilane. Feed B consists of a mixture of 254 g of butyl acetate and 116 g 2,2'-azobis-(2-methyl butane nitrile) available as VAZO-67 from E. I. DuPont de Nemours and Company. Feed C consists of 154 g butyl acetate and 116 g gamma-mercaptopropyltrimethoxysilane. After the addition of the three feeds A, B, and C is complete, a mixture of 22 g butyl acetate and 9.28 g of VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued.

The resultant product is an addition interpolymer of the invention.

The resultant product has a theoretical total solids content of 72.5 percent by weight, an experimentally determined total solids content at 110 degrees C. for 1 hour of 71.15 percent by weight, a Gardner Holdt bubble tube viscosity of G-H, a color value of 1, and acid value of 0.1, and a peak molecular weight of the addition interpolymer of 2685 as determined by gel permeation chromatography using a polystyrene standard. Analysis of the resultant product shows a content of butyl methacrylate of 0.49 percent by weight, a content of butyl acrylate of 0.19 percent by weight, and a content of isobornyl methacrylate of 1.16 percent by weight.

EXAMPLE 2

This example illustrates the preparation of an addition interpolymer for use in the basecoating composition and in a clearcoating composition of Example 9.

The following monomers are used to make the addition interpolymer:

| | Percent by Weight |
|---|---|
| Methyl methacrylate | 40.0 |
| Styrene | 25.0 |
| Butyl acrylate | 10.0 |
| Butyl methacrylate | 10.0 |
| Gamma-methacryloxy-propyltrimethoxysilane | 15.0 |

A reaction vessel equipped with condenser, stirrer, thermometer and means for maintaining a nitrogen blanket is charged with 336 g of butyl acetate, 144.0 g of VM & P naphtha, and 96.0 g of toluene and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 896.0 g 2-ethylhexyl methacrylate, 224.0 g butyl methacrylate, 224.0 g butyl acrylate, 560.0 g styrene, and 336.0 g gamma-methacryloxypropyltrimethoxysilane. Feed B consists of a mixture of 192.0 g of butyl acetate and 112.0 g di-tertiarybutyl peroxide. Feed C consists of 192.0 g butyl acetate and 112.0 g gamma-mercaptopropyl trimethoxysilane. After the addition of the three feeds A, B, and C is complete, 8.96 g of di-tertiarybutyl peroxide is added all at once to the vessel and the contents of the vessel held at reflux for 1 hour. Next, 8.96 g of the di-tertiarybutyl peroxide is added all at once to the vessel and the contents of the vessel thereafter held at reflux for an additional 1½ hours after which period heating is discontinued and the contents of the vessel allowed to cool to room temperature. The resultant product is a silane addition interpolymer.

The resultant product has a theoretical total solids content of 70 percent by weight, an experimentally determined total solids content at 150 degrees C. for 1 hour of 71.15 percent by weight, a Gardner Holdt bubble tube viscosity of Z-2+, an acid value of 0.09, and a peak molecular weight of the silane addition interpolymer of 7800 and a weight average molecular weight of 10,000 both determined by gel permeation chromatography using a polystyrene standard. Analysis of the resultant product shows an undetectable amount of styrene, a content of butyl methacrylate of 0.09 percent by weight, a content of butyl acrylate of 0.06 percent by weight, and a content of methyl methacrylate of 0.4 percent by weight.

EXAMPLE 3

The following monomers are used to make an addition interpolymer of the invention:

| | Percent by Weight |
|---|---|
| Isobornyl methacrylate | 40.0 |
| Butyl methacrylate | 20.0 |
| Methyl methacrylate | 20.0 |
| Gamma-methacryloxy-propyltrimethoxysilane | 20.0 |

A 4-neck flask equipped with condenser, stirrer, thermometer, 3 dropping funnels, and means for maintaining a nitrogen blanket is charged with 428 g of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 928 g isobornyl methacrylate, 464 g butyl methacrylate, 464 g methyl methacrylate, and 464 g gamsamethacryloxypropyltrimethoxysilane. Feed B consists of a mixture of 254 g of butyl acetate and 116 g 2,2'-azobis-(2-methyl butane nitrile) available as VAZO-67 from E.I. DuPont de Nemours and Company. Feed C consists of 154 g butyl acetate and 116 g gamma-mercaptopropyltrimethoxysilane. After the addition of the three feeds A, B, and C is complete, a mixture of 22 g butyl acetate and 9.28 g VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued and the contents of the vessel allowed to cool to room temperature.

The resultant product is an addition interpolymer of the invention.

The resultant product has a theoretical total solids content of 72.5 percent by weight, an experimentally determined total solids content at 110 degrees C. for 1 hour of 67.4 percent by weight, an experimentally determined total solids content at 150 degrees C. for 1 hour of 66.0 percent by weight, a Gardner Holdt bubble tube viscosity of S, an acid value of 0, and a peak molecular weight of the addition interpolymer of 2900 as determined by gel permeation chromatography using a polystyrene standard. Analysis of the resultant product shows a content of butyl methacrylate of 0.86 percent by weight, a content of methyl methacrylate of 0.67 percent by weight, and a content of isobornyl methacrylate of 2.60 percent by weight.

EXAMPLE 4

The following monomers are used to make an addition interpolymer of the invention:

|  | Percent by Weight |
| --- | --- |
| Isobornyl methacrylate | 20.0 |
| Styrene | 20.0 |
| Butyl methacrylate | 20.0 |
| Methyl methacrylate | 20.0 |
| Gamma-methacryloxy-propyltrimethoxysilane | 20.0 |

A 4-neck flask equipped with condenser, stirrer, thermometer, 3 dropping funnels, and means for maintaining a nitrogen blanket is charged with 440.0 g of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 464.0 g isobornyl methacrylate, 464.0 g styrene, 464.0 g butyl methacrylate, 464.0 g methyl methacrylate, and 464.0 g gamma-methacryloxypropyltrimethoxysilane. Feed B consists of a mixture of 264.0 g of butyl acetate and 116 g 2,2'-azobis-(2-methyl butane nitrile) available as VAZO-67 from E. I. DuPont de Nemours and Company. Feed C consists of 132.0 g butyl acetate and 116.0 g gamma-mercaptopropyltrimethoxysilane. After the addition of the three feeds A, B, and C is complete, a mixture of 22 g butyl acetate and 9.28 g VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued and the contents of the vessel allowed to cool to room temperature.

The resultant product is an addition interpolymer of the invention.

The resultant product has a theoretical total solids content of 72.5 percent by weight, an experimentally determined total solids content at 150 degrees C. for 1 hour of 67.4 percent by weight, a viscosity of 8.28 Stokes, an acid value of 0.02, a color value of 1, and a peak molecular weight of the addition interpolymer of 3143 as determined by gel permeation chromatography using a polystyrene standard. Analysis of the resultant product shows a content of butyl methacrylate of 0.62 percent by weight, a content of methyl methacrylate of 0.50 percent by weight, a content of isobornyl methacrylate of 0.69 percent by weight and a content of styrene of 0.03 percent by weight.

EXAMPLE 5

The following monomers are used to make an addition interpolymer of the invention:

|  | Percent by Weight |
| --- | --- |
| Isobornyl methacrylate | 15.0 |
| Styrene | 25.0 |
| Butyl methacrylate | 20.0 |
| Methyl methacrylate | 20.0 |
| Gamma-methacryloxy-propyltrimethoxysilane | 20.0 |

A 4-neck flask equipped with condenser, stirrer, thermometer, 3 dropping funnels, and means for maintaining a nitrogen blanket is charged with 440.0 g of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 348.0 g isobornyl methacrylate, 580.0 g styrene, 464.0 g butyl methacrylate, 464.0 g methyl methacrylate, and 464.0 g gamma-methacryloxypropyltrimethoxysilane. Feed B consists of a mixture of 264.0 g of butyl acetate and 116 g 2,2'-azobis-(2-methyl butane nitrile) available as VAZO-67 from E. I. DuPont de Nemours and Company. Feed C consists of 132.0 g butyl acetate and 116.0 g gamma-mercaptopropyltrimethoxysilane. After the addition of the three feeds A, B, and C is complete, a mixture of 22 g butyl acetate and 9.28 g VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued and the contents of the vessel allowed to cool to room temperature.

The resultant product is an addition interpolymer of the invention.

The resultant product has a theoretical total solids content of 72.5 percent by weight, an experimentally determined total solids content at 150 degrees C. for 1 hour of 69.5 percent by weight, a viscosity of 11.6 Stokes, an acid value of 0, a color value of 1, and a peak molecular weight of the addition interpolymer of 3386 as determined by gel permeation chromatography using a polystyrene standard. Analysis of the resultant product shows a content of butyl methacrylate of 0.52 percent by weight, a content of isobornyl methacrylate of 0.40 percent by weight and a content of styrene of 0.05 percent by weight.

EXAMPLE 6

The following monomers are used to make an addition interpolymer of the invention:

|                              | Percent by Weight |
| ---------------------------- | ----------------- |
| Isobornyl methacrylate       | 10.0              |
| Styrene                      | 30.0              |
| Butyl methacrylate           | 20.0              |
| Methyl methacrylate          | 20.0              |
| Gamma-methacryloxy-propyltrimethoxysilane | 20.0 |

A 4-neck flask equipped with condenser, stirrer, thermometer, 3 dropping funnels, and means for maintaining a nitrogen blanket is charged with 440.0 g of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 232.0 g isobornyl methacrylate, 696.0 g styrene, 464.0 g butyl methacrylate, 464.0 g methyl methacrylate, and 464.0 g gamma-methacryloxypropyltrimethoxysilane. Feed B consists of a mixture of 264.0 g of butyl acetate and 116 g 2,2'-azobis-(2-methyl butane nitrile) available as VAZO-67 from E. I. DuPont de Nemours and Company. Feed C consists of 132.0 g butyl acetate and 116.0 g gamma-mercaptopropyltrimethoxysilane. After the addition of the three feeds A, B, and C is complete, a mixture of 22 g butyl acetate and 9.28 g VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued and the contents of the vessel allowed to cool to room temperature.

The resultant product is an addition interpolymer of the invention.

The resultant product has a theoretical total solids content of 72.5 percent by weight, an experimentally determined total solids content at 150 degrees C. for 1 hour of 70.6 percent by weight, a viscosity of 13.7 Stokes, an acid value of 0, a color value of 1, and a peak molecular weight of the addition interpolymer of 3651 as determined by gel permeation chromatography using a polystyrene standard. Analysis of the resultant product shows a content of butyl methacrylate of 0.41 percent by weight, a content of isobornyl methacrylate of 0.22 percent by weight and a content of styrene of 0.05 percent by weight.

EXAMPLE 7

The following monomers are used to make an addition interpolymer of the invention:

|                              | Percent by Weight |
| ---------------------------- | ----------------- |
| Isobornyl methacrylate       | 40.0              |
| Styrene                      | 20.0              |
| Methyl methacrylate          | 20.0              |
| Gamma-methacryloxy-propyltrimethoxysilane | 20.0 |

A 4-neck flask equipped with condenser, stirrer, thermometer, 3 dropping funnels, and means for maintaining a nitrogen blanket is charged with 440.0 g of butyl acetate and heated to reflux, about 125 degrees C., while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 928.0 g isobornyl methacrylate, 464.0 g styrene, 464.0 g methyl methacrylate, and 464.0 g gamma-methacryloxypropyl trimethoxysilane. Feed B consists of a mixture of 264.0 g of butyl acetate and 116 g 2,2'-azobis-(2-methyl butane nitrile) available as VAZO-67 from E. I. DuPont de Nemours and Company. Feed C consists of 132.0 g butyl acetate and 116.0 g gamma-mercaptopropyl trimethoxysilane. After the addition of the three feeds A, B, and C is complete, a mixture of 22 g butyl acetate and 9.28 g VAZO-67 is added all at once to the vessel and the contents of the vessel held at reflux for 1 hour. Next, another mixture of 22 g butyl acetate and 9.28 g of the VAZO-67 is added all at once to the vessel and the contents of the vessel thereafter held at reflux for an additional 1½ hours after which period heating is discontinued and the contents of the vessel allowed to cool to room temperature.

The resultant product is an addition interpolymer of the invention.

The resultant product has a theoretical total solids content of 72.5 percent by weight, an experimentally determined total solids content at 150 degrees C. for 1 hour of 68.6 percent by weight, a viscosity of 13.2 Stokes, an acid value of 0.0, a color value of 2, and a peak molecular weight of the addition interpolymer of 3119 as determined by gel permeation chromatography using a polystyrene standard. Analysis of the resultant product shows a content of methyl methacrylate of 0.56 percent by weight, a content of isobornyl methacrylate of 1.69 percent by weight and a content of styrene of 0.02 percent by weight.

EXAMPLE 8

The following monomers are used to make a comparative silane addition interpolymer for use in a clearcoating composition of Example 9.

|                              | Percent by Weight |
| ---------------------------- | ----------------- |
| Methyl methacrylate          | 40.0              |
| Styrene                      | 25.0              |
| Gamma-methacryloxy-propyltrimethoxysilane | 25.0 |
| 2-Ethylhexyl methacrylate    | 10.0              |

A 4-neck flask equipped with condenser, stirrer, thermometer, 3 dropping funnels, and means for maintaining a nitrogen blanket is charged with 448.0 g of butyl acetate, 192.0 g of VM & P Naphtha and 128.0 g of toluene and heated to reflux while under a nitrogen blanket and agitation. Three feeds identified herein as A, B, and C are next gradually and simultaneously added to the vessel over a period of two hours while the contents of the vessel are maintained at reflux conditions. Feed A consists of a mixture of 768.0 g methyl methacrylate, 480.0 g styrene, 480.0 g gamma-methacryloxypropyl trimethoxysilane and 192.0 g 2-ethylhexyl methacrylate. Feed B consists of a mixture of 224.0 g of butyl acetate and 96 g 2,2'-azobis-(2-methyl butane nitrile) available as VAZO-67 from E. I. DuPont de Nemours and Company. Feed C consists of 224.0 g butyl acetate and 96.0 g gamma-mercaptopropyl trimethoxysilane. After the addition of the three feeds A, B, and C is complete, a mixture of 32.0 g butyl acetate and 7.68 g VAZO-67 is added all at once to the vessel and the contents of the vessel held at reflux for 1 hour.

Next, another mixture of 32 g butyl acetate and 7.68 g of the VAZO-67 is added all at once to the vessel and the contents of the vessel thereafter held at reflux for an additional 1½ hours after which period heating is discontinued and the contents of the vessel allowed to cool to room temperature.

The resultant product is a comparative silane addition interpolymer.

The resultant product has a theoretical total solids content of 60.0 percent by weight, an experimentally determined total solids content at 150 degrees C. for 1 hour of 58.0 percent by weight, a viscosity of 1.35 Stokes, an acid value of 0.2, a color value of 1-, and a peak molecular weight of the silane addition interpolymer of 3776 as determined by gel permeation chromatography using a polystyrene standard. Analysis of the resultant product shows a content of methyl methacrylate of 0.65 percent by weight, a content of 2-ethylhexyl methacrylate of 0.53 percent by weight and a content of styrene of 0.04 percent by weight.

EXAMPLE 9

This example illustrates advantages when addition interpolymers of the invention are utilized in clear topcoating (clearcoating) compositions applied over a basecoating composition in a "color plus clear" application.

(a) The formulations of the basecoating composition and clear coating compositions are as set forth in the following TABLES 1 and 2 respectively.

TABLE 1

| Basecoating Composition | Weight (grams) |
| --- | --- |
| Methyl ethyl ketone | 20.5 |
| Butyl acetate | 36.9 |
| Diethylene glycol monobutyl ether acetate | 10.0 |
| Organoclay[1] | 0.9 |
| UV absorber[2] | 0.9 |
| Triethylorthoformate | 4.3 |
| Flow control agent[3] | 0.3 |
| Pattern control agent[4] | 40.0 |
| Acrylic silane solution[5] | 83.6 |
| Pigment paste[6] | 52.6 |

[1]Available as BENTONE SD-2 from NL Industries, Inc..
[2]Available from Ciba-Geigy Corp. as TINUVIN 328.
[3]Available as BYK 300 from BYK Mallinekrodt Chem. Produkte GmbH.
[4]A dispersion of organic polymer microparticles at 44 percent by weight solids in 56 percent by weight of a solvent mixture (containing 1.19 percent toluene, 2.67 percent VM & P naphtha, 6.91 percent butyl acetate, 26.95 percent ISOPAR E from EXXON Corp., and 62.93 percent heptane). The dispersion of organic polymer microparticles is prepared from 139.9 pbw of heptane, 59.9 pbw of ISOPAR E from EXXON Corp., 147.2 pbw of methylmethacrylate, 7.6 pbw of glycidylmethacrylate, 37.6 pbw of a dispersion stabilizer solution, 0.447 pbw of ARMEEN DMCD (dimethyl cocoamine), 1.081 pbw of VAZO 67 initiator, 1.592 pbw of n-octyl mercaptan, and 4.626 pbw of methacrylic acid. The dispersion stabilizer solution contained 40 percent by weight solids and 60 percent by weight of a mixture of solvents. The dispersion stabilizer is a polymer prepared by graft polymerizing 49.5 percent by weight of a reaction product of 10.8 percent by weight of glycidyl methacrylate and 89.2 percent by weight of 12-hydroxystearic acid, with 45.4 percent by weight of methylmethacrylate and 4.2 percent by weight of glycidyl methacrylate, wherein the resulting copolymer product containing pendant epoxy groups is reacted with 0.9 percent by weight of methacrylic acid. The mixture of solvents of the dispersion stabilizer solution contains 68.5 percent by weight of butylacetate, 26.3 percent by weight of VM & P naphtha, and 5.2 percent by weight of toluene. The dispersion of organic polymer microparticles is prepared according to the teachings of U.S. Pat. No. 4,147,688 hereby incorporated by reference.
[5]As made in Example 2.
[6]Prepared by combining 71.5 pbw of aluminum flake pigment, 41.9 pbw butyl acetate and 90.7 pbw of an acrylic polyol having a peak molecular weight of between 18,000 and 20,000 and a Gardner-Holdt viscosity of Y- (prepared from 30.0% by weight methyl methacrylate, 25.0% by weight styrene, 19.0% by weight butyl methacrylate, 12.0% by weight 2-ethylhexyl acrylate and 14.0% by weight 2-hydroxyethyl acrylate).

TABLE 2

| Clearcoating Composition | Weight (grams) | | | | | | |
| --- | --- | --- | --- | --- | --- | --- | --- |
| | A | B | C | D | E | F (comparison) | G (comparison) |
| Product of Example 3 | 137.5 | 0 | 0 | 0 | 0 | | |
| Product of Example 4 | 0 | 137.5 | 0 | 0 | 0 | | |
| Product of Example 5 | 0 | 0 | 137.5 | 0 | 0 | | |
| Product of Example 6 | 0 | 0 | 0 | 137.5 | 0 | | |
| Product of Example 7 | 0 | 0 | 0 | 0 | 137.5 | | |
| Product of Example 8 | | | | | | 170.7 | 0 |
| Product of Example 2 | | | | | | 0 | 148.6 |
| Cellulose acetate butyrate | 1.0 | 1.0 | 1.0 | 1.0 | 1.0 | 1.0 | 1.0 |
| Butyl acetate | 43.2 | 43.2 | 43.2 | 43.2 | 43.2 | 10.0 | 32.1 |
| UV absorber[1] | 2.0 | 2.0 | 2.0 | 2.0 | 2.0 | 2.0 | 2.0 |
| Polysiloxane solution[2] | 0.6 | 0.6 | 0.6 | 0.6 | 0.6 | 0.6 | 0.6 |
| Flow control agent[3] | 0.6 | 0.6 | 0.6 | 0.6 | 0.6 | 0.6 | 0.6 |
| Flow control agent[4] | 0.2 | 0.2 | 0.2 | 0.2 | 0.2 | 0.2 | 0.2 |
| Triethylorthoformate | 5.0 | 5.0 | 5.0 | 5.0 | 5.0 | 5.0 | 5.0 |
| Dibutyl tin dilaurate | 2.0 | 2.0 | 2.0 | 2.0 | 2.0 | 2.0 | 2.0 |
| Thinner[5] | 40.5 | 40.5 | 40.5 | 40.5 | 40.5 | 40.5 | 85.7 |
| Total weight | 232.6 | 232.6 | 232.6 | 232.6 | 232.6 | 232.6 | 277.8 |
| Percent Solids | 43.0% | 43.0% | 43.0% | 43.0% | 43.0% | 43.0% | 36.0% |

[1]Available from Ciba-Geigy Corp. as TINUVIN 328.
[2]The polysiloxane is available from DOW Corning Corporation as DC 200, 135 csk. Dissolved in xylene to give a 0.5 percent polysiloxane content.
[3]Available as BYK 300 from BYK Mallinekrodt Chem. Produkte GmbH.
[4]Available as MODAFLOW from Monsanto Industrial Chemicals Company.
[5]The thinner contains 23 percent butyl acetate, 6 percent ethyl acetate, 4 percent xylene, 25 percent VM & P naphtha, 24 percent toluene, 6 percent DOWANOL PM acetate from DOW CORNING Corp., and 11 percent HEXATE 100 from Shell Chemical Co., all percentages being by volume.

The basecoating composition (see TABLE 1) is reduced 150 percent by volume with a lacquer thinner available as DTL-105 from DITZLER Automotive Finishes, PPG INDUSTRIES, INC.(i.e., 1 part by volume basecoating composition to 1.5 parts by volume lacquer thinner). The basecoating composition is spray applied to 24 gauge cold rolled steel panels (treated with BONDERITE 40, primed with a primer surfacer available as DZL-32 from DITZLER Automotive Finishes, PPG INDUSTRIES, INC., and sanded with No. 400 grit paper) to form the basecoats. The basecoats are allowed to flash for 15 minutes at room temperature. Immediately thereafter, the clearcoating compositions (see TABLE 2 above) are spray applied to the basecoats to form clear topcoats (clearcoats).

The basecoats and clearcoats are allowed to moisture cure at room temperature for 24 hours under ambient atmospheric conditions to the dry film thicknesses of the basecoats and topcoats as set forth in the following TABLE 3. Some properties of the resulting cured composite basecoat/clearcoats are as set forth in TABLE 3. These properties are determined after 24 hours and 120 hours respectively from when the clearcoating compositions are applied to the basecoats. In TABLE 3 the left and right hand entries represented with a slash in between (as in 4B/B) mean the respective values for the property determined after 24 hours and 120 hours respectively. "DFT BC" means "dry film thickness in mils of the basecoat", and "DFT CC" means "dry film thickness in mils of the clearcoat. "DOI" means "distinctness of image" measured 24 hours after application of the clearcoating composition to the basecoat. A film having a high distinctness of image when viewed from a direction close to the normal to the surface and under, for example, a light fixture such as a fluorescent light fixture having a cross-hatch grid in front of the bulb, exhibits a reflected image of the lighted fixture in the film which appears clear and sharply distinct and seems to originate deep in the film. "Tg" means the calculated glass transition temperature in degrees C. for the acrylic silane interpolymer utilized in the clearcoating composition. "Gasoline soak" means resistance to deterioration by the composite film to soaking for 3 minutes in gasoline. For gasoline soak a rating of 1 means excellent; a rating of 1- means very good; and a rating of 2 means good.

TABLE 3

| Example | 20 Degree Gloss | DOI | Tg | Pencil Hardness | Gasoline Soak | DFT BC | DFT CC |
|---|---|---|---|---|---|---|---|
| A | 87/87 | 65 | 110 | 4B/B | 2/1 | 0.8 | 2.6 |
| B | 91/91 | 70 | 105 | 4B/B | 1/1 | 0.8 | 2.6 |
| C | 92/91 | 70 | 100 | 4B/B | 1-/1 | 0.8 | 2.5 |
| D | 93/93 | 80 | 97 | 4B/B | 1/1 | 0.8 | 2.6 |
| E | 93/93 | 85 | 120 | 4B/B | 1-/1 | 0.8 | 2.7 |
| F (Comp.) | 91/92 | 55 | 87 | 4B/E | 1/1 | 0.8 | 2.7 |
| G (Comp.) | 91/91 | 60 | 70 | 4B/B | 1/1 | 0.8 | 2.4 |

It would be expected that at lower Tg, their would be better flow and therefore better appearance, i.e., gloss and DOI, but also softer cured films. Surprisingly, the higher Tg materials which contain the isobornyl (meth)acrylate not only have excellent flow but even better appearance properties in addition to other advantageous properties for an ambient curing composition such as hardness.

What is claimed is:

1. An addition interpolymer containing at least one silicon atom directly bonded to a hydrolyzable group, said addition interpolymer derived from a mixture of copolymerizable ethylenically unsaturated monomers comprising an isobornyl group-containing monomer selected from the group consisting of isobornyl methacrylate, isobornyl acrylate and a mixture thereof; wherein the amount of said isobornyl group-containing monomer ranges from 10 percent to 60 percent by weight based on the total weight of said mixture of copolymerizable ethylenically unsaturated monomers.

2. An addition interpolymer containing alkoxy silane groups and/or acyloxy silane groups, said interpolymer derived from the reaction of a mixture of monomers wherein the mixture of monomers contains:
  (i) one or more ethylenically unsaturated silicon-free monomers comprising an isobornyl group-containing monomer selected from the group consisting of isobornyl methacrylate, isobornyl acrylate and a mixture thereof; and
  (ii) a copolymerizable ethylenically unsaturated silane monomer selected from the group consisting of an alkoxy silane monomer, an acyloxy silane monomer, and a mixture thereof;
wherein the amount of said isobornyl group-containing monomer ranges from 10 percent to 60 percent by weight based on the total weight of said mixture of monomers.

3. The addition interpolymer of claim 2 wherein the amount of said ethylenically unsaturated silicon-free monomers ranges from about 50 percent to about 95 percent by weight based on the total weight of said mixture of monomers, and the amount of said copolymerizable ethylenically unsaturated silane monomer ranges from about 5 to about 50 percent by weight based on the total weight of said mixture of monomers.

4. The addition interpolymer of claim 2 wherein said ethylenically unsaturated silicon-free monomers (i) comprise an alkyl acrylate, alkyl methacrylate, vinyl aromatic hydrocarbon or a mixture thereof.

5. The addition interpolymer of claim 4 wherein said alkyl acrylate and alkyl methacrylate contain from 1 to 12 carbon atoms in the alkyl group.

6. The addition interpolymer of claim 4 wherein said vinyl aromatic hydrocarbon is styrene, vinyl toluene, alpha-methylstyrene or a mixture thereof.

7. The addition interpolymer of claim 4 wherein said silane monomer is a (meth)acrylatoalkoxysilane monomer having from 1 to 4 carbon atoms in the alkoxy group.

8. The addition interpolymer of claim 7 wherein said (meth)acrylatoalkoxysilane monomer is gamma-methacryloxypropyltrimethoxysilane, gasma-methacryloxypropyltriethoxysilane, or a mixture thereof.

9. The addition interpolymer of claim 2 having a peak molecular weight as determined by gel permeation chromatography ranging from about 2,000 to about 20,000.

10. The addition interpolymer of claim 9 having a calculated glass transition temperature of at least about 25 degrees Celsius.

11. The addition interpolymer of claim 10 wherein said mixture of monomers contains from about 70 percent to about 90 percent by weight of said ethylenically unsaturated silicon-free monomers (i), from about 10 percent to about 30 percent by weight of said copolymerizable ethylenically unsaturated silane monomer (ii), and from 40 percent to 20 percent by weight of said isobornyl group-containing monomer, based on the total weight of said mixture of monomers, and wherein said addition interpolymer has a calculated glass transition temperature of from about 30 degrees Celsius to about 120 degrees Celsius.

12. The addition interpolymer of claim 9 wherein a mercaptoalkyl trialkoxysilane is used as a chain transfer agent in the reaction of said mixture of monomers.

13. A coating composition comprising: an addition interpolymer containing at least one silicon atom directly bonded to a hydrolyzable group, said addition interpolymer derived from a mixture of copolymerizable ethylenically unsaturated monomers comprising an isobornyl group-containing monomer selected from the group consisting of isobornyl methacrylate, isobornyl acrylate and a mixture thereof; wherein the amount of said isobornyl group-containing monomer ranges from 10 percent to 60 percent by weight based on the total weight of said mixture of copolymerizable ethylenically unsaturated monomers.

14. A coating composition comprising: an addition interpolymer containing alkoxy silane groups and/or acyloxy silane groups, said interpolymer derived from the reaction of a mixture of monomers wherein the mixture of monomers contains:
  (i) one or more ethylenically unsaturated silicon-free monomers comprising an isobornyl group-containing monomer selected from the group consisting of isobornyl methacrylate, isobornyl acrylate and a mixture thereof; and
  (ii) a copolymerizable ethylenically unsaturated silane monomer selected from the group consisting of an alkoxy silane monomer, an acyloxy silane monomer, and a mixture thereof;
wherein the amount of said isobornyl group-containing monomer ranges from 10 percent to 60 percent by weight based on the total weight of said mixture of monomers.

15. The coating composition of claim 14 additionally comprising an effective amount of a cure promoting catalyst.

16. The coating composition of claim 15 wherein the amount of said ethylenically unsaturated silicon-free monomers ranges from about 50 percent to about 95 percent by weight based on the total weight of said mixture of monomers, and the amount of said copolymerizable ethylenically unsaturated silane monomer ranges from about 5 to about 50 percent by weight based on the total weight of said mixture of monomers.

17. The coating composition of claim 15 wherein said ethylenically unsaturated silicon-free monomers (i) comprise an alkyl acrylate, alkyl methacrylate, vinyl aromatic hydrocarbon or a mixture thereof.

18. The coating composition of claim 17 wherein said alkyl acrylate and alkyl methacrylate contain from 1 to 12 carbon atoms in the alkyl group.

19. The coating composition of claim 17 wherein said vinyl aromatic hydrocarbon is styrene, vinyl toluene, alpha-methylstyrene or a mixture thereof.

20. The coating composition of claim 17 wherein said silane monomer is a (meth)acrylatoalkoxysilane monomer having from 1 to 4 carbon atoms in the alkoxy group.

21. The coating composition of claim 20 wherein said (meth)acrylatoalkoxysilane monomer is gamma-methacryloxypropyltrimethoxysilane, gamma-methacryloxypropyltriethoxysilane, or a mixture thereof.

22. The coating composition of claim 15 wherein said addition interpolymer has a peak molecular weight as determined by gel permeation chromatography ranging from about 2,000 to about 20,000.

23. The coating composition of claim 22 wherein said addition interpolymer has a calculated glass transition temperature of at least about 25 degrees Celsius.

24. The coating composition of claim 23 wherein said mixture of monomers contains from about 70 percent to about 90 percent by weight of said ethylenically unsaturated silicon-free monomers (i), from about 10 percent to about 30 percent by weight of said copolymerizable ethylenically unsaturated silane monomer (ii), and from 40 to 20 percent by weight of said isobornyl group-containing monomer, based on the total weight of said mixture of monomers, and wherein said addition interpolymer has a calculated glass transition temperature of from about 30 degrees Celsius to about 120 degrees Celsius.

25. The coating composition of claim 22 wherein a mercaptoalkyl trialkoxysilane is used as a chain transfer agent in the reaction of said mixture of monomers.

26. The coating composition of claim 14 wherein the total solids content of said composition is at least about 40 percent by weight when the viscosity of the composition is 25 seconds or less on a No. 4 Ford Cup.

* * * * *